(12) United States Patent
Staples et al.

(10) Patent No.: US 12,134,943 B2
(45) Date of Patent: Nov. 5, 2024

(54) KELLY VALVE

(71) Applicant: M&M International, LLC, Cade, LA (US)

(72) Inventors: Tripp Cappel Staples, Youngsville, LA (US); Shaun Paul Montet, Youngsville, LA (US); Juan Carlos Hincapie, Broussard, LA (US)

(73) Assignee: M&M INTERNATIONAL, LLC, Cade, LA (US)

( * ) Notice: Subject to any disclaimer, the term of this patent is extended or adjusted under 35 U.S.C. 154(b) by 7 days.

(21) Appl. No.: 17/789,981

(22) PCT Filed: Sep. 29, 2021

(86) PCT No.: PCT/US2021/052514
§ 371 (c)(1),
(2) Date: Jun. 29, 2022

(87) PCT Pub. No.: WO2022/072398
PCT Pub. Date: Apr. 7, 2022

(65) Prior Publication Data
US 2023/0062916 A1    Mar. 2, 2023

Related U.S. Application Data

(60) Provisional application No. 63/084,874, filed on Sep. 29, 2020.

(51) Int. Cl.
*E21B 21/12*    (2006.01)
*E21B 21/10*    (2006.01)
(Continued)

(52) U.S. Cl.
CPC .............. *E21B 21/106* (2013.01); *F16K 1/14* (2013.01); *F16K 5/0694* (2013.01); *F16K 5/205* (2013.01); *F16K 25/005* (2013.01); *F16K 25/04* (2013.01)

(58) Field of Classification Search
CPC ........ E21B 21/106; E21B 34/02; E21B 34/04; E21B 34/06; E21B 34/063; E21B 34/08;
(Continued)

(56) References Cited

U.S. PATENT DOCUMENTS 3,883,112 A * 5/1975 Milleville ............. F16K 5/0673
251/315.08
4,538,790 A * 9/1985 Williams ............. F16K 5/0694
251/312

FOREIGN PATENT DOCUMENTS

CN    110686092 A  *  1/2020
GB       2140896 A  * 12/1984   ........... F16K 5/0678

* cited by examiner

*Primary Examiner* — Marina A Tietjen
(74) *Attorney, Agent, or Firm* — LAW OFFICE OF JESSE D. LAMBERT, LLC

(57) ABSTRACT

A kelly valve for placement in a tubular drillstring has an inner cage, which holds a valve ball, lower valve ball seat and other valve components. A valve stem connected to the valve ball extends through a valve stem sleeve, positioned in an opening in the wall of the main body of the kelly valve. A thrust bearing of a low friction material, preferably of polyether ether ketone (PEEK), is positioned between the valve stem and the valve stem sleeve. A port in the valve ball seat permits pressure below the kelly valve to bypass a seal and act on the inside of the valve ball. A circumferential notch in the valve ball seat accommodates a circular spring, and prevents complete compression of the spring when the valve ball seat contacts an interior shoulder in the inner cage.

16 Claims, 6 Drawing Sheets

(51) Int. Cl.
*F16K 1/14* (2006.01)
*F16K 5/06* (2006.01)
*F16K 5/20* (2006.01)
*F16K 25/00* (2006.01)
*F16K 25/04* (2006.01)

(58) Field of Classification Search
CPC ...... E21B 34/10; E21B 34/101; E21B 34/102;
E21B 34/12; E21B 34/14; E21B 34/16;
F16K 5/0694; F16K 5/205; F16K 41/026;
F16K 41/046; F16K 41/086
See application file for complete search history.

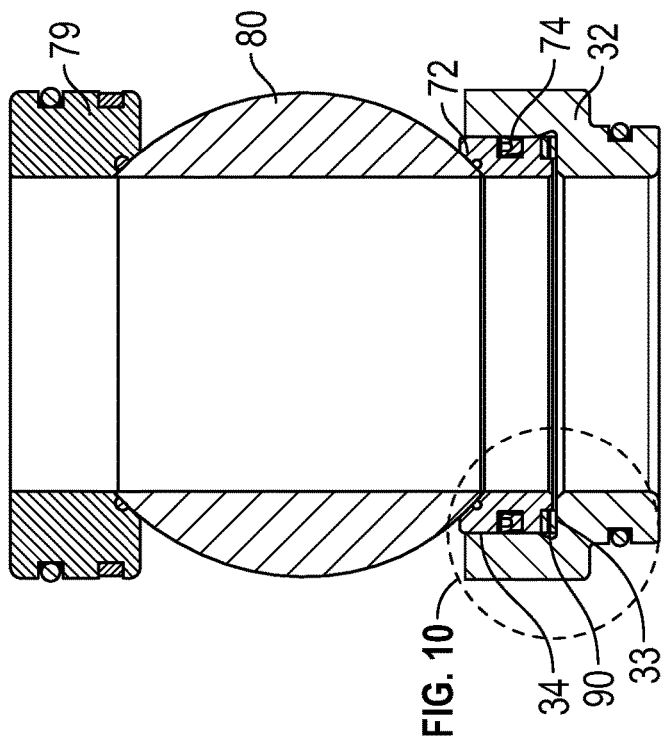
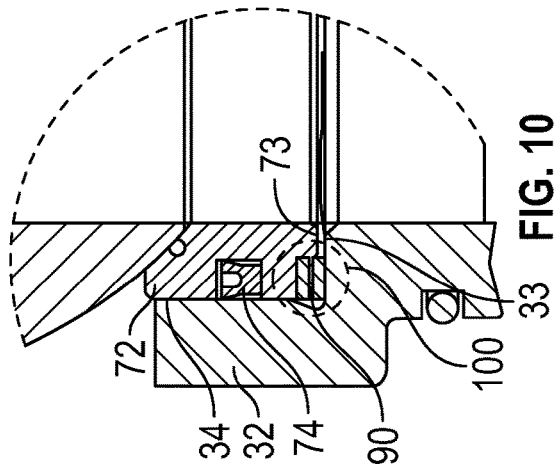
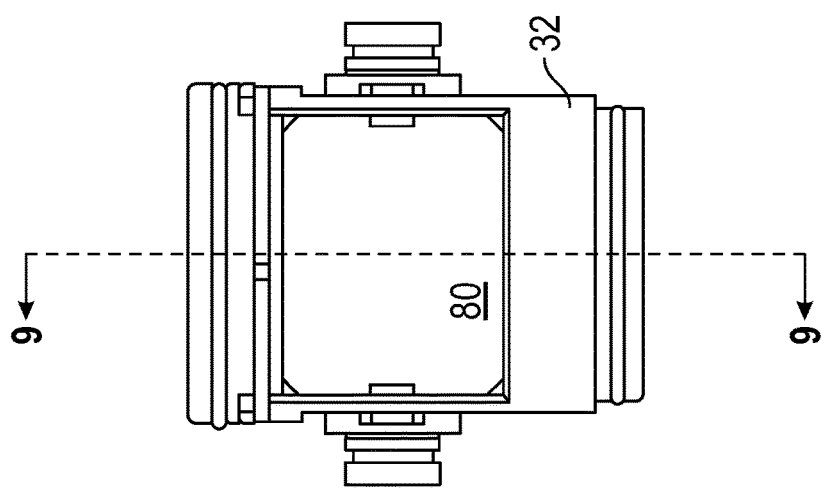

KELLY VALVE

CROSS REFERENCE TO RELATED APPLICATIONS

This United States non-provisional patent application claims priority to U.S. provisional patent application Ser. 63/084,874, filed Sep. 29, 2020, for all purposes. The disclosure of that provisional patent application is incorporated herein by reference, to the extent not inconsistent with this disclosure.

BACKGROUND

Field of the Invention

Various types of valves are used in connection with the drilling and servicing of oil and gas wells. One type of valve is placed in a tubular string (e.g. a drillstring or work string) which is being used for drilling or servicing of oil and gas wells, commonly referred to as a "kelly valve," installed in a drillstring above and/or below the kelly. Similar valves are used in completion, workover, and other well servicing situations, and may be referred to as "safety valves," but structurally are similar to kelly valves. Various types of kelly valves are known in the art. All of such valves will be referred to generally herein as "kelly valves."

An example of a valve in this art field is disclosed in U.S. Pat. No. 5,246,203, issued Sep. 21, 1993, which discloses an Oilfield Valve having certain structural aspects useful in understanding the kelly valve of the present invention.

Prior art kelly valves present various issues, giving rise to a desire for an improved kelly valve that addresses these issues.

SUMMARY OF THE INVENTION

The kelly valve embodying the principles of the present invention comprises a main body with a longitudinal bore therethrough, forming a wall of the main body, with a valve component cage positioned in the bore, the cage preferably containing various operating elements of the valve, including a rotatable valve ball positioned therein. The valve ball has a bore, which when rotated to be generally aligned with the bore of the main body, permits flow through the kelly valve; when the bore of the valve ball is rotated, generally by 90 degrees, the bore of the valve ball is brought out of alignment with the bore of the main body, thereby closing the valve and preventing pressure or fluid flow across the valve. A valve stem connects to the valve ball, extends through an opening in the wall of the main body, and permits rotation of the valve ball by either manual or hydraulic means.

The kelly valve of the present invention preferably comprises:
- one or more, typically two, circular rings of a non-metallic material, preferably polyether ether ketone (commonly referred to by the acronym PEEK), positioned between the valve stem and the valve stem sleeve, forming a thrust bearing for the valve stem;
- improved lip seal bypass structure, allowing for pressure bypass around the lower valve ball seat and into the interior of the valve ball, at relatively low pressures;
- improved valve stem sleeve structure, reducing valve stem hole scarring from valve actuation, particularly when the valve is operated by hydraulic means;
- modified lower valve ball seat geometry to reduce or eliminate compression set on wave springs positioned between the lower valve ball seat and the canister cage; and
- valve stem seals of a generally T-shaped cross section (to seal against the valve stem sleeve), in lieu of traditional O-rings/backup rings.

BRIEF DESCRIPTION OF THE DRAWINGS

FIG. 8 is a side view of the cage, with the ball and other elements positioned therein.

FIG. 9 is a section view along lines 9-9 in FIG. 8.

FIG. 10 is a more detailed view of the circled area in FIG. 9.

DESCRIPTION OF THE PRESENTLY PREFERRED EMBODIMENT(S)

While various kelly valves can embody the principles of the present invention, with reference to the drawings some of the presently preferred embodiments can be described.

Figure 1:
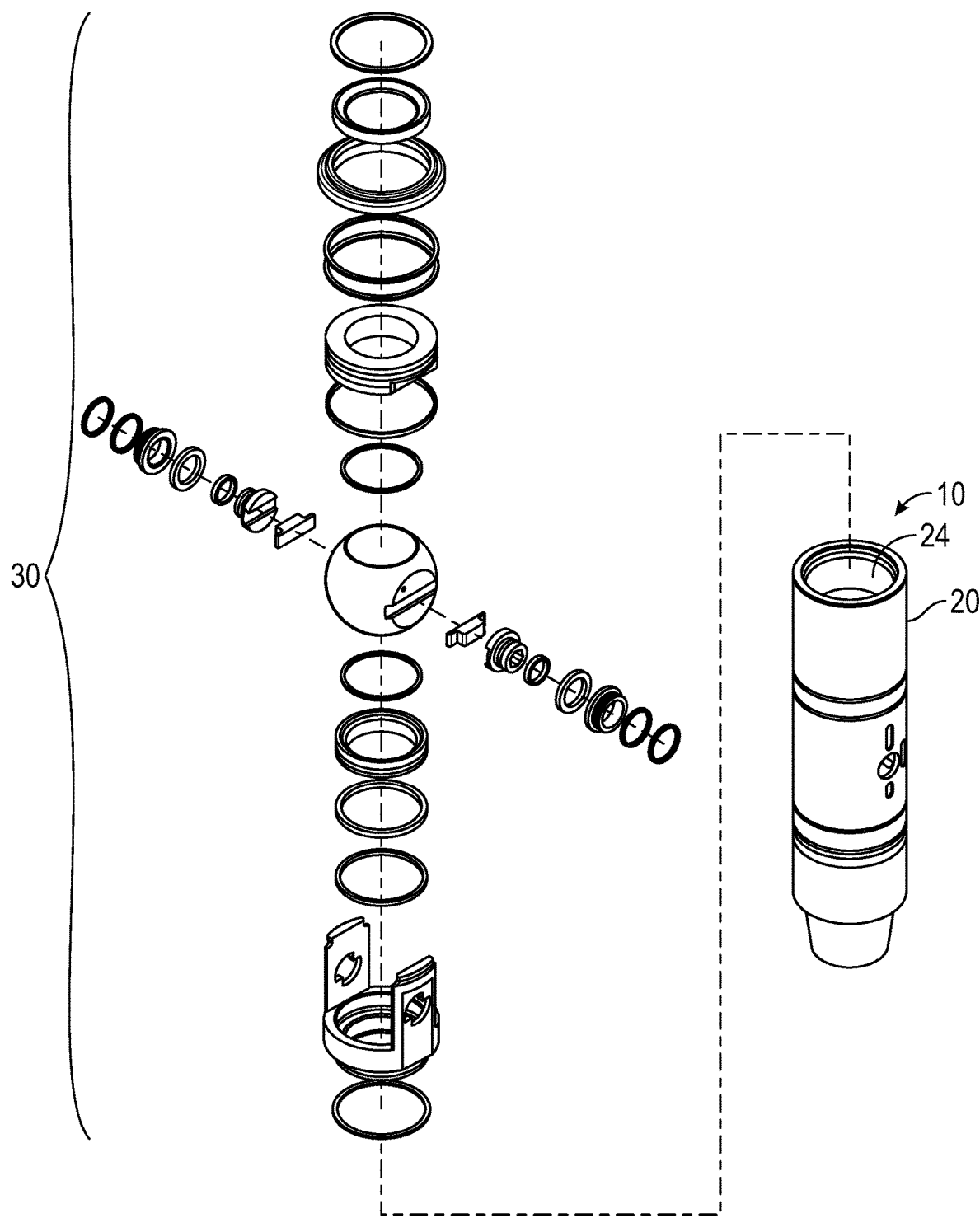
FIG. 1 is a perspective, exploded view of one embodiment of the various elements of the kelly valve, to be assembled within the main valve body.

FIG. 1 is an exploded view of the various elements comprising the internal components of the kelly valve 10, which are assembled together into a so-called "canister," with canister 30 then installed in the main body 20 of kelly valve 10. FIG. 8 is a side view of canister 30.

Figure 2:
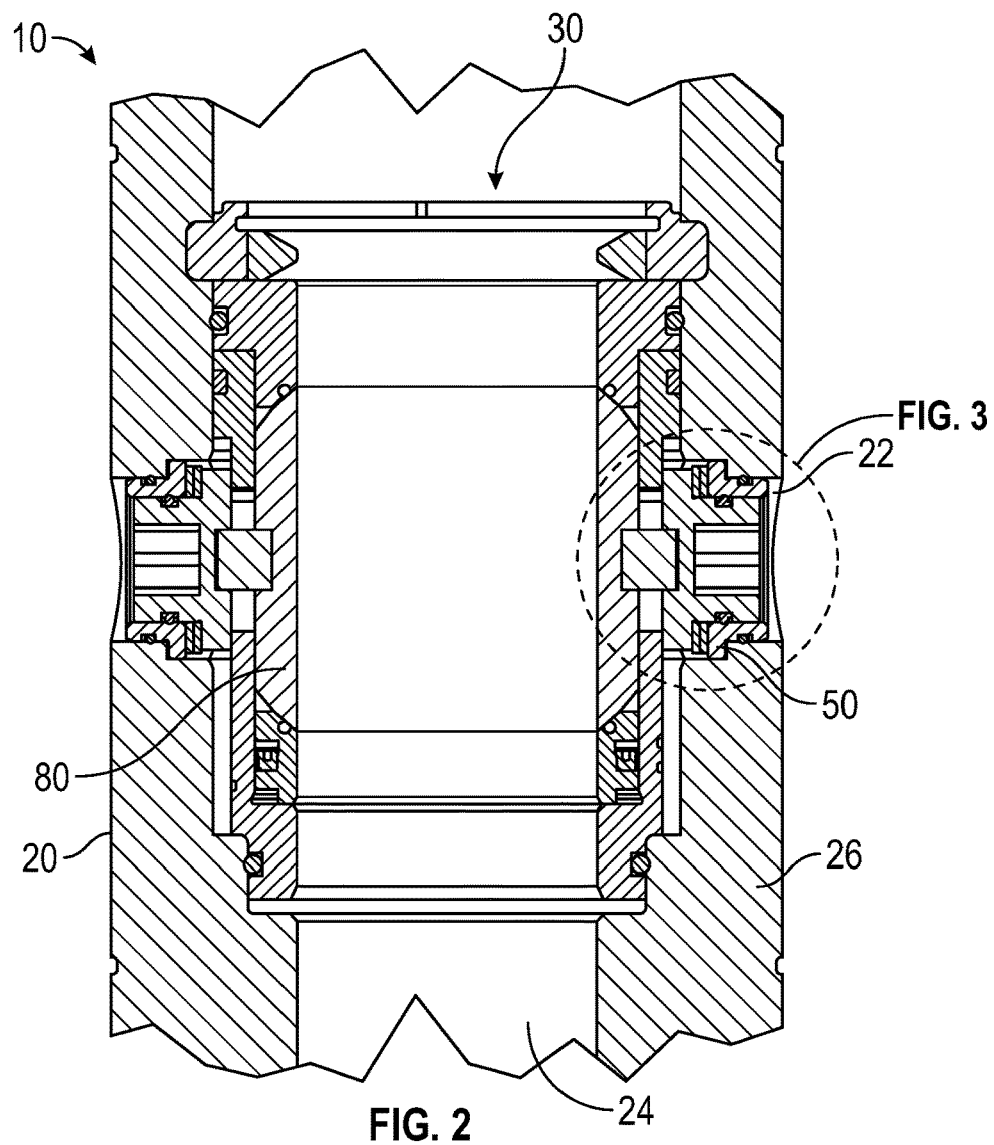
FIG. 2 is a more detailed cross section view of certain of the elements of the kelly valve.

FIG. 2 is a cross section view of a portion of kelly valve 10, showing canister 30 positioned within main body 20. As can be seen in FIGS. 1 and 2, main body 20 comprises a longitudinal bore 24, forming a wall 26. The circled area in FIG. 2, noted as "FIG. 3," identifies the area of more detailed section view of FIG. 3, and in still further detail in FIG. 4.

Figure 3:
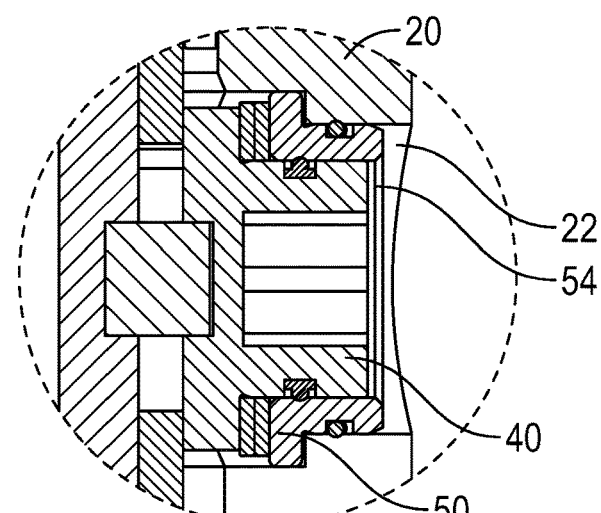
FIGS. 3 and 4 are still more detailed cross section views corresponding to the emphasized area in FIG. 2.
Figure 4:
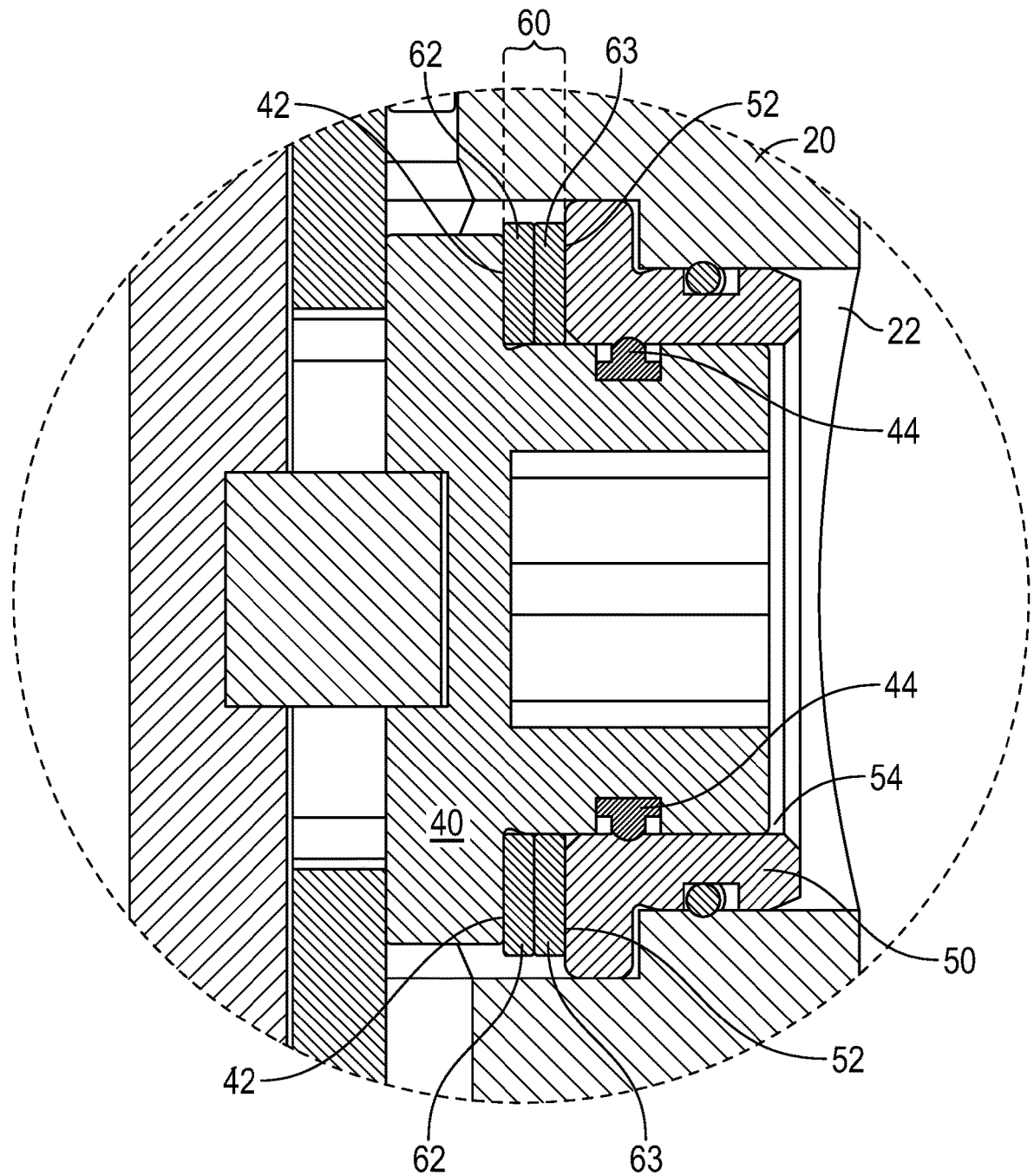

With reference to FIGS. 3 and 4, certain of the elements of the kelly valve 10 can be described. Main body 20 has a circular hole or opening 22 connecting to bore 24, into which valve stem sleeve 50 fits. As can be seen in the figures, valve stem sleeve 50 is a collar or bushing shaped element, with a central bore 54, into which a portion of valve stem 40 closely fits. Valve stem sleeve 50 comprises a radially inward shoulder surface 52, facing longitudinal bore 24. Valve stem 40 is pushed or thrust radially outward by pressure contained within kelly valve 10; as can be understood from the drawings, shoulder 42 of valve stem 40 therefore tends to be pushed toward valve stem sleeve 50, and more particularly shoulder 42 is pushed toward radially inward shoulder surface 52 of valve stem sleeve 50.

With reference to the figures, especially FIG. 4, in order to reduce friction forces between valve stem 40 and valve stem sleeve 50, more specifically between shoulder 42 and radially inward shoulder surface 52, therefore making rotation of valve ball 80 easier, some form of bearing, namely a thrust bearing 60, is positioned between shoulder 42 of valve stem 40 and the radially inward shoulder surface 52 of valve stem sleeve 50. In a preferred embodiment, thrust bearing 60 comprises one or more, preferably two, circular rings 62, 63 of a non-metallic material, preferably polyether ether ketone (commonly referred to by the acronym PEEK, and so referred to at times in this application), which is corrosion resistant and possesses other desirable qualities for thrust bearings in corrosive environments. PEEK is known for not only its corrosion resistant nature but also its low friction, "oily" characteristics. Therefore, thrust bearing 60 preferably comprises one or more, preferably two, circular rings 62, 63, formed of PEEK material, yielding a kelly valve having favorable operating characteristics (i.e. low valve stem torque requirements), while remaining resistant to corrosion. As can be understood from the drawings, PEEK rings 62, 63 preferably have the general shape of circular washers or rings, with central openings through which valve stem 40 is positioned. It is understood that any number of circular rings, for example PEEK rings, may be used; and in addition or alternatively, thrust bearing 60 may comprise one or more circular rings of some other, preferably non-metallic material. It is understood that certain metallic materials may be used, for example in combination with PEEK material. It is further understood that other configurations of thrust bearings may be suitable, especially those made of PEEK, of a structure other than a circular ring, e.g. discreet segments of PEEK material, etc. The scope of the invention covers thrust bearings formed from PEEK material, in any configuration.

Additional elements of kelly valve 10 are shown in the figures, especially FIG. 4. A valve stem seal 44, disposed between valve stem 40 and the bore wall of bore 54 of valve stem sleeve 50, preferably comprises a generally T-shaped cross section shape, referred to herein as valve stem T-seal 44. Valve stem T-seal 44 is preferably made from various resilient seal materials known in the art, and the interference fit aspect of the T-shape (in cross section) yields increased life, compared to O-rings and similar prior art seal shapes. As noted above, valve stem sleeve 50 is disposed in hole or opening 22 in main body 20, with valve stem 40 extending through bore 54 of valve stem sleeve 50, making valve stem sleeve 50 a replaceable element that prevents direct contact between valve stem 40 and the wall of opening 22, therefore preventing direct contact with main body 20. The replaceable aspect of valve stem sleeve 50 is especially useful in hydraulically actuated embodiments of kelly valve 10, as the increased operating force applied to valve stem 40 under such actuation tends to result in an increased chance of scarring of the wall of opening 22.

Figure 5:
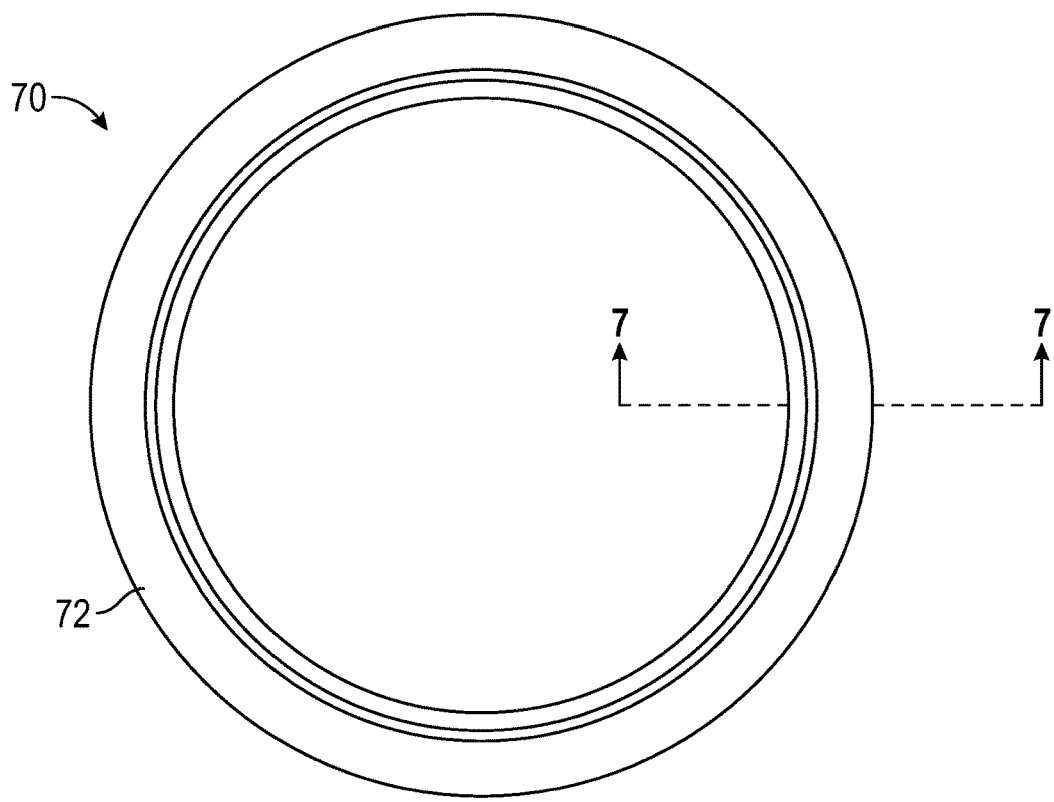
FIG. 5 is a view of the lower valve ball seat, which includes the lip seal.
Figure 6:
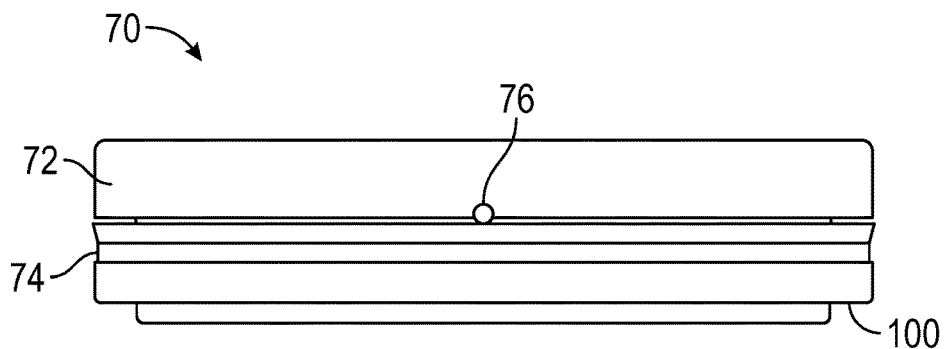
FIG. 6 is a side view of the lower valve ball seat, also showing the seal element (lip seal) and the seal element bypass port.
Figure 7:
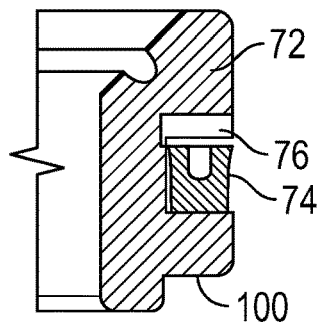
FIG. 7 is a section view corresponding to the section line of FIG. 5, showing further detail of the lower valve ball seat, the seal element, and the seal element bypass port.

Kelly valve 10 further comprises a lower valve ball seat 70, which can be seen in FIGS. 9 and 10, in in more detail in FIGS. 5-7. Generally, lower valve ball seat 70 is disposed at the bottom of valve ball 80, between valve ball 80 and cage 32 of canister 30. Cage 32 comprises a lower bore section 34, and comprises a shoulder 33 at the lower end of lower bore section 34.

Figure 7A:
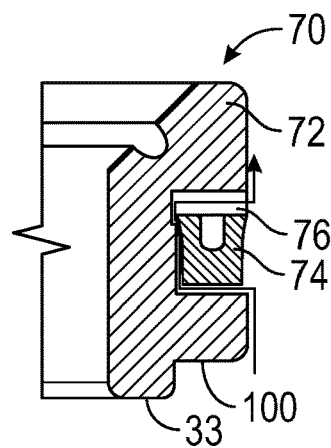
FIG. 7A is a detail, cross section view of a portion of the lower valve ball seat, and seal element, illustrating a path of pressure transmission through the bypass port.
Figure 7B:
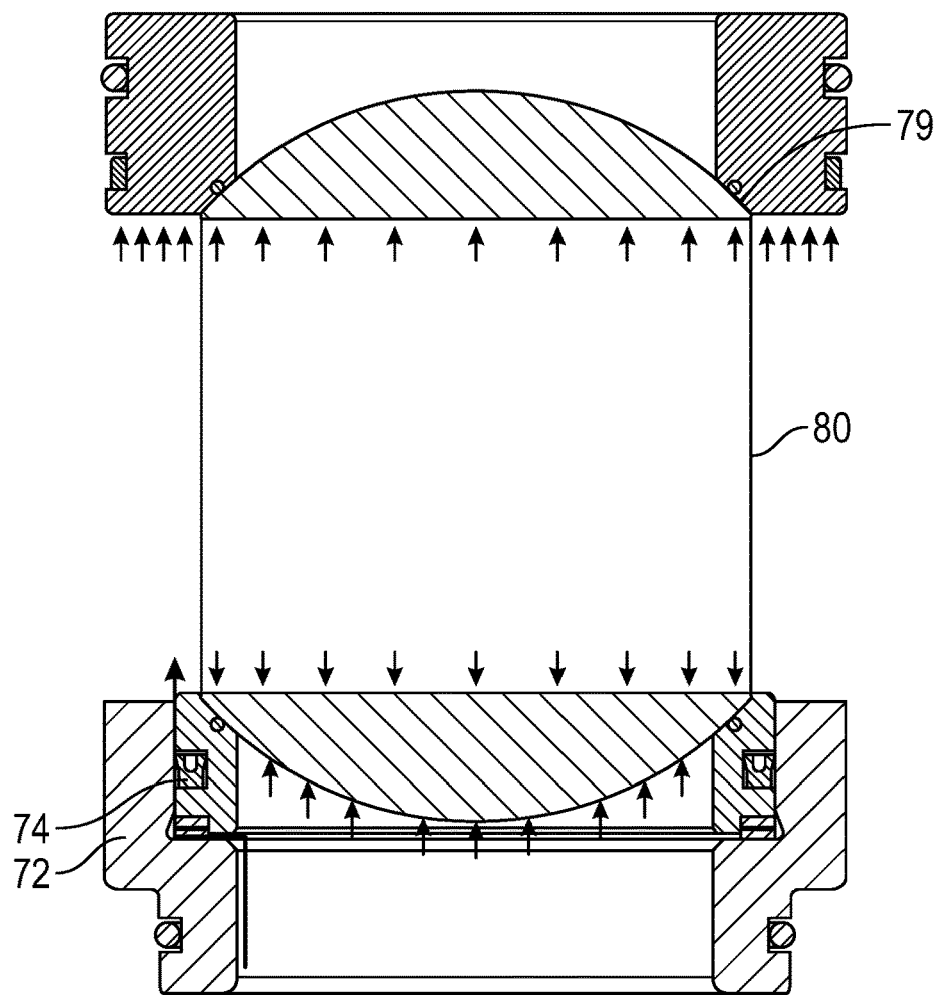
FIG. 7B is a cross section view of the kelly valve with the valve ball in a closed position, showing a pressure transmission path.

Referring to FIGS. 5-7, lower valve ball seat 70 comprises a ring 72 against which valve ball 80 seats, and a seal element 74 (which may be referred to as a "lip seal") to seal between lower seat 70 and lower bore section 34 of cage 32. Lower valve ball seat 70 further comprises a seal bypass port 76, which may take the form of a port or passage, which permits pressure from below kelly valve 10 to bypass seal element 74 and enter bore of ball 80, when valve 10 is closed and pressure is imposed below valve 10. FIG. 7A shows an exemplary pressure path around seal element 74. Generally, the cross section shape of seal element 74, as can be seen especially in FIGS. 7 and 7A, may result in minimal or no pressure seal being formed against pressure below kelly valve 10. Under certain conditions, seal element 74 will move upwardly in response to such pressure, as can be seen in FIG. 7A. Referring again to FIG. 7A, pressure can then bypass seal element 74, and go through seal bypass 76, therefore allowing pressure from below valve 10 to act on the interior of valve ball 80, namely the bore therein, thereby tending to force ball 80 upward against upper seat 79. FIG. 7B illustrates the pressure path. As such, upward forces acting on the lowermost exterior of ball 80 are reduced, in turn reducing the tendency of such forces to deform ball 80, etc.

Referring to the figures, esp. FIGS. 6, 7, 7A, 9 and 10, lower valve ball seat 70, especially ring 72 thereof, comprises a circumferential notch 100 in which one or more springs, preferably wave springs 90, are positioned. As can be seen in the figures, wave springs 90 are positioned between lower valve ball seat 70 and shoulder 33 of cage 32. Under certain pressure conditions, valve ball 80, along with lower valve ball seat 70, is pushed downwardly toward shoulder 33 of cage 32. With sufficient downward movement, lower surface 73 of lower valve ball seat 70 will contact shoulder 33 on cage 32; circumferential notch 100 is dimensioned so that lower surface 73 will contact shoulder 33 on cage 32, hence stopping any further downward movement of lower valve ball seat 70, before wave springs 90 are fully collapsed. This attribute (namely, preventing complete compression of wave springs 90) preserves the function of wave springs 90.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof.

Therefore, the scope of the invention is to be determined not by the illustrative examples set forth above, but by the appended claims and their legal equivalents.

We claim:

1. A kelly valve, comprising:
a main body comprising a longitudinal bore therethrough, forming a wall of said main body, and an opening in said wall connecting to said longitudinal bore, said opening comprising a wall surface;
a valve component cage disposed in said longitudinal bore, and a valve ball disposed in said cage;
a valve stem sleeve disposed in said opening, said valve stem sleeve comprising a bore therethrough and a radially inward shoulder surface facing said longitudinal bore of said main body;
a valve stem disposed in said bore of said valve stem sleeve and connected to said valve ball for rotating said valve ball, said valve stem comprising a shoulder presenting a surface to said radially inward shoulder surface of said valve stem sleeve; and a thrust bearing disposed between said shoulder of said valve stem and said radially inward shoulder surface of said valve stem sleeve, wherein said valve component cage, said valve ball, said valve stem sleeve, said valve stem, and said thrust bearing are assembled to form a canister, said canister adapted to be removably positioned within said longitudinal bore of said main body.

2. The kelly valve of claim 1, wherein said thrust bearing is formed from polyether ether ketone (PEEK) material.

3. The kelly valve of claim 2, wherein said thrust bearing comprises one or more circular rings.

4. The kelly valve of claim 1, wherein said thrust bearing is formed from a non-metallic material.

5. The kelly valve of claim 1, further comprising a seal disposed between said valve stem sleeve and said wall surface of said opening of said main body.

6. The kelly valve of claim 5, wherein said seal comprises a generally T-shape cross section.

7. The kelly valve of claim 1, wherein said cage comprises a lower bore section and further comprising a lower valve ball seat disposed therein, said lower valve ball seat comprising a seal element sealing between said lower bore section of said canister and said lower ball valve seat from pressure above said lower valve ball seat, said lower valve ball seat comprising a bypass port therein, whereby pressure from below said valve ball can be transmitted around said seal element and enter said valve ball, when said valve ball is closed.

8. The kelly valve of claim 7, wherein said cage further comprises a shoulder in said lower bore section, and further comprising a circular spring disposed between a bottom facing surface of said lower valve ball seat and said shoulder in said lower bore section of said cage, said lower valve ball seat comprising a circumferential notch in which said circular spring is disposed, such that when said lower valve ball seat contacts said shoulder in said lower bore section of said cage, said spring is not fully compressed.

9. The kelly valve of claim 8, wherein said spring comprises one or more wave springs.

10. The kelly valve of claim 1, wherein said cage further comprises a shoulder in said lower bore section, and further comprising a circular spring disposed between a bottom facing surface of said lower valve ball seat and said shoulder in said lower bore section of said cage, said lower valve ball seat comprising a circumferential notch in which said circular spring is disposed, such that when said lower valve ball seat contacts said shoulder in said lower bore section of said cage, said spring is not fully compressed.

11. The kelly valve of claim 10, wherein said spring comprises one or more wave springs.

12. A kelly valve, comprising:
a main body comprising a longitudinal bore therethrough, forming a wall of said main body, and an opening in said wall connecting to said longitudinal bore, said opening comprising a wall surface;
a valve component cage disposed in said longitudinal bore, and a valve ball disposed in said cage;
a valve stem sleeve disposed in said opening, said valve stem sleeve comprising a bore therethrough and a radially inward shoulder surface facing said longitudinal bore of said main body;
a valve stem disposed in said bore of said valve stem sleeve and connected to said valve ball for rotating said valve ball, said valve stem comprising a shoulder presenting a surface to said radially inward shoulder surface of said valve stem; and
a thrust bearing disposed between said shoulder of said valve stem and said radially inward shoulder surface of said valve stem, wherein said thrust bearing is formed from polyether ether ketone (PEEK) material, and wherein said cage comprises a lower bore section and further comprising a lower valve ball seat disposed therein, said lower valve ball seat comprising a seal element sealing between said lower bore section of said cage and said lower ball valve seat from pressure above said lower valve ball seat, said lower valve ball seat comprising a bypass port therein, whereby pressure from below said valve ball can be transmitted around said seal element and enter said valve ball, when said valve ball is closed.

13. The kelly valve of claim 12, wherein said cage further comprises a shoulder in said lower bore section, and further comprising a circular spring disposed between a bottom facing surface of said lower valve ball seat and said shoulder in said lower bore section of said cage, said lower valve ball seat comprising a circumferential notch in which said circular spring is disposed, such that when said lower valve ball seat contacts said shoulder in said lower bore section of said cage, said spring is not fully compressed.

14. A kelly valve, comprising:
a main body comprising a longitudinal bore therethrough, forming a wall of said main body, and an opening in said wall connecting to said longitudinal bore, said opening comprising a wall surface;
a valve component cage disposed in said longitudinal bore, and a valve ball disposed in said cage;
a valve stem sleeve disposed in said opening, said valve stem sleeve comprising a bore therethrough and a radially inward shoulder surface facing said longitudinal bore of said main body;
a valve stem disposed in said bore of said valve stem sleeve and connected to said valve ball for rotating said valve ball, said valve stem comprising a shoulder presenting a surface to said radially inward shoulder surface of said valve stem sleeve; and
a thrust bearing disposed between said shoulder of said valve stem and said radially inward shoulder surface of said valve stem sleeve, wherein said cage comprises a lower bore section and further comprising a lower valve ball seat disposed therein, said lower valve ball seat comprising a seal element sealing between said lower bore section of a cage and said lower ball valve seat from pressure above said lower valve ball seat, said lower valve ball seat comprising a bypass port therein, whereby pressure from below said valve ball can be transmitted around said seal element and enter said valve ball, when said valve ball is closed.

15. The kelly valve of claim 14, wherein said cage further comprises a shoulder in said lower bore section, and further comprising a circular spring disposed between a bottom facing surface of said lower valve ball seat and said shoulder in said lower bore section of said cage, said lower valve ball seat comprising a circumferential notch in which said circular spring is disposed, such that when said lower valve ball seat contacts said shoulder in said lower bore section of said cage, said spring is not fully compressed.

16. The kelly valve of claim 15, wherein said cage further comprises a shoulder in said lower bore section, and further comprising a circular spring disposed between a bottom facing surface of said lower valve ball seat and said shoulder in said lower bore section of said cage, said lower valve ball seat comprising a circumferential notch in which said circular spring is disposed, such that when said lower valve ball seat contacts said shoulder in said lower bore section of said cage, said spring is not fully compressed.

* * * * *